US009536142B2

(12) United States Patent
Stone

(10) Patent No.: US 9,536,142 B2
(45) Date of Patent: *Jan. 3, 2017

(54) AUTOMATED USER INFORMATION PROVISION USING IMAGES

(71) Applicant: PAYPAL, INC., San Jose, CA (US)

(72) Inventor: Carl B. Stone, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/259,924

(22) Filed: Apr. 23, 2014

(65) Prior Publication Data

US 2014/0219568 A1    Aug. 7, 2014

Related U.S. Application Data

(63) Continuation of application No. 13/117,210, filed on May 27, 2011, now Pat. No. 8,724,931.

(51) Int. Cl.
| | |
|---|---|
| *G06K 9/00* | (2006.01) |
| *G06Q 10/10* | (2012.01) |
| *G06Q 30/02* | (2012.01) |
| *G06Q 30/06* | (2012.01) |

(52) U.S. Cl.
CPC ....... *G06K 9/00456* (2013.01); *G06K 9/00449* (2013.01); *G06Q 10/10* (2013.01); *G06Q 30/0281* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 6,370,259 B1 * | 4/2002 | Hobson | B07C 3/14 |
| | | | 382/101 |
| 6,499,042 B1 | 12/2002 | Markus | |
| 6,526,352 B1 | 2/2003 | Breed et al. | |
| 6,651,217 B1 | 11/2003 | Kennedy et al. | |
| 6,778,683 B1 * | 8/2004 | Bonner | G06K 9/00973 |
| | | | 209/584 |

(Continued)

OTHER PUBLICATIONS

A probabilstic approach—interfaces., Tada et al., VLDB, vol. 4 No. 3, 2010, pp. 151-160.*

(Continued)

*Primary Examiner* — Jayesh A Patel
(74) *Attorney, Agent, or Firm* — Haynes and Boone, LLP

(57) ABSTRACT

A method for automated user information provision using an image includes requesting at least one user information image in response to receiving a user information form from a requesting entity over a network. The at least one user information image is received from a camera. The at least one user information image is analyzed using a processor to determine that the at least one user information image includes requested user information in at least one request section of the user information form. The requested user information is automatically provided into the at least one request section of the user information form. The user information form including the requested user information in the at least one request section is displayed on a display. The user information form may then be sent over the network to provide the requested user information to the requesting entity.

20 Claims, 13 Drawing Sheets

(56) References Cited

U.S. PATENT DOCUMENTS

| | | | |
|---|---|---|---|
| 6,961,456 B2* | 11/2005 | Bonner | G06K 9/00973 198/346.1 |
| 7,177,444 B2* | 2/2007 | Bonner | G06K 9/00973 209/584 |
| 7,181,344 B2 | 2/2007 | Lehmann et al. | |
| 7,203,699 B2 | 4/2007 | Bellamy | |
| 7,231,220 B2 | 6/2007 | Reddy et al. | |
| 7,421,126 B2* | 9/2008 | Deere | G06K 9/2054 382/163 |
| 7,430,422 B2 | 9/2008 | Nagatsuma et al. | |
| 7,496,560 B2* | 2/2009 | Manber | G06Q 30/02 |
| 7,885,378 B2 | 2/2011 | Kopans et al. | |
| 8,150,156 B2 | 4/2012 | Geva et al. | |
| 8,160,607 B2 | 4/2012 | Choi et al. | |
| 8,520,889 B2 | 8/2013 | Navon et al. | |
| 8,521,737 B2 | 8/2013 | Hart et al. | |
| 2003/0182052 A1* | 9/2003 | DeLorme | G01C 21/26 701/533 |
| 2004/0068520 A1 | 4/2004 | Masaoka | |
| 2004/0167706 A1* | 8/2004 | Becker | G01S 5/0009 701/467 |
| 2004/0204836 A1 | 10/2004 | Riney | |
| 2004/0236710 A1* | 11/2004 | Clary | G06F 3/04883 706/46 |
| 2006/0221409 A1* | 10/2006 | Cohen | G06Q 10/10 358/462 |
| 2006/0262976 A1* | 11/2006 | Hart | G06F 17/30247 382/190 |
| 2007/0154098 A1* | 7/2007 | Geva | G06F 17/243 382/209 |
| 2008/0040259 A1* | 2/2008 | Snow | G06Q 40/02 705/38 |
| 2010/0128922 A1* | 5/2010 | Navon | G06K 9/00449 382/100 |
| 2012/0011463 A1 | 1/2012 | Payne et al. | |

OTHER PUBLICATIONS

A probabilstic approach—interfaces, Tada et al., VLDB, vol. 4, No. 3, 2010, pp. 151-160.

* cited by examiner

ACCOUNT SIGN-UP

Name:

Birth Date:

MAILING ADDRESS

Street:

City:

State:

Zip Code:

PAYMENT INFORMATION

CC #:

CC Exp:

CC Sec.Code:

USER DEVICE 200

FIGURE 2a

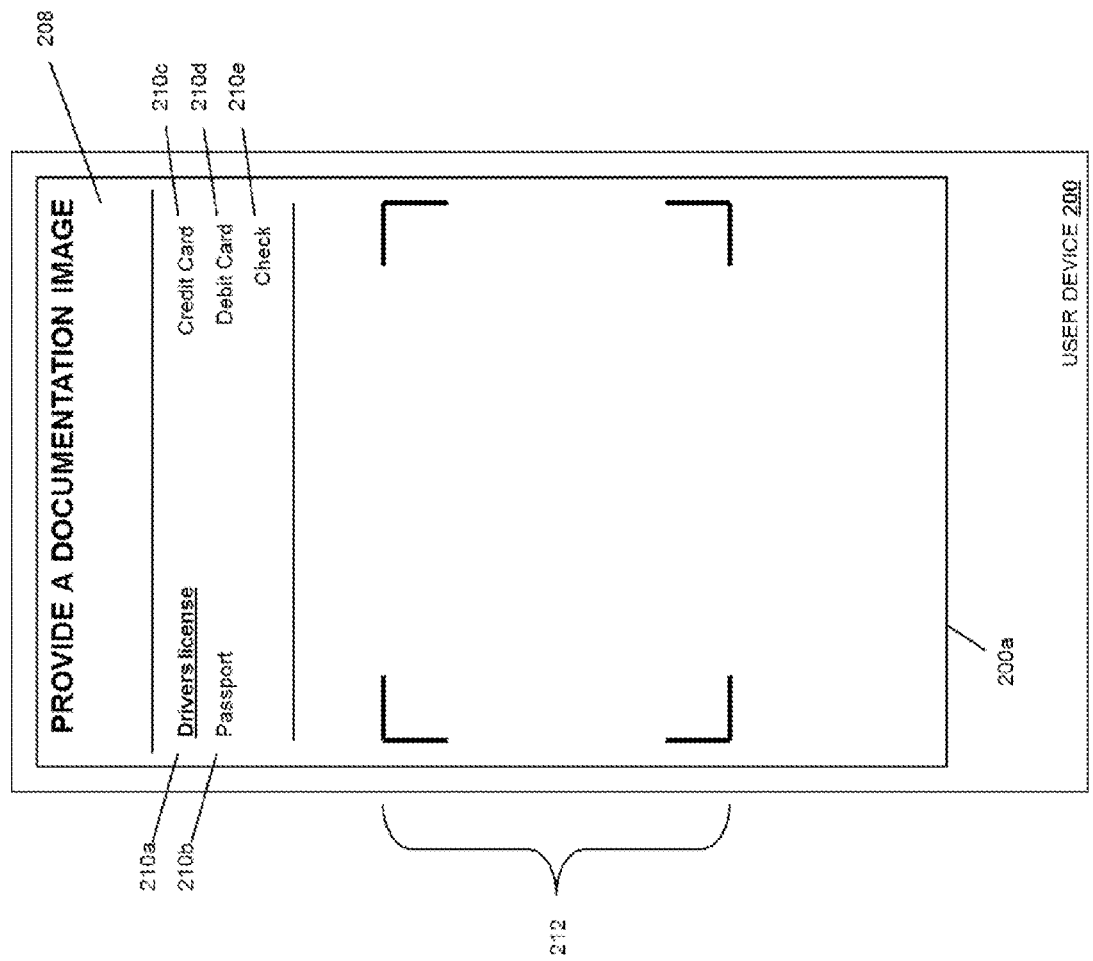

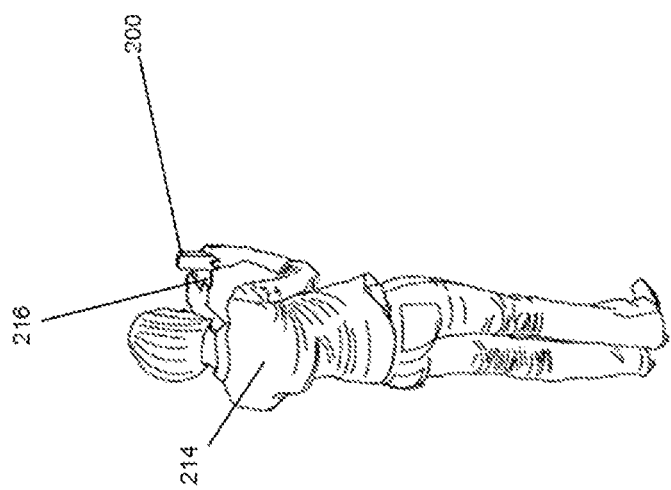

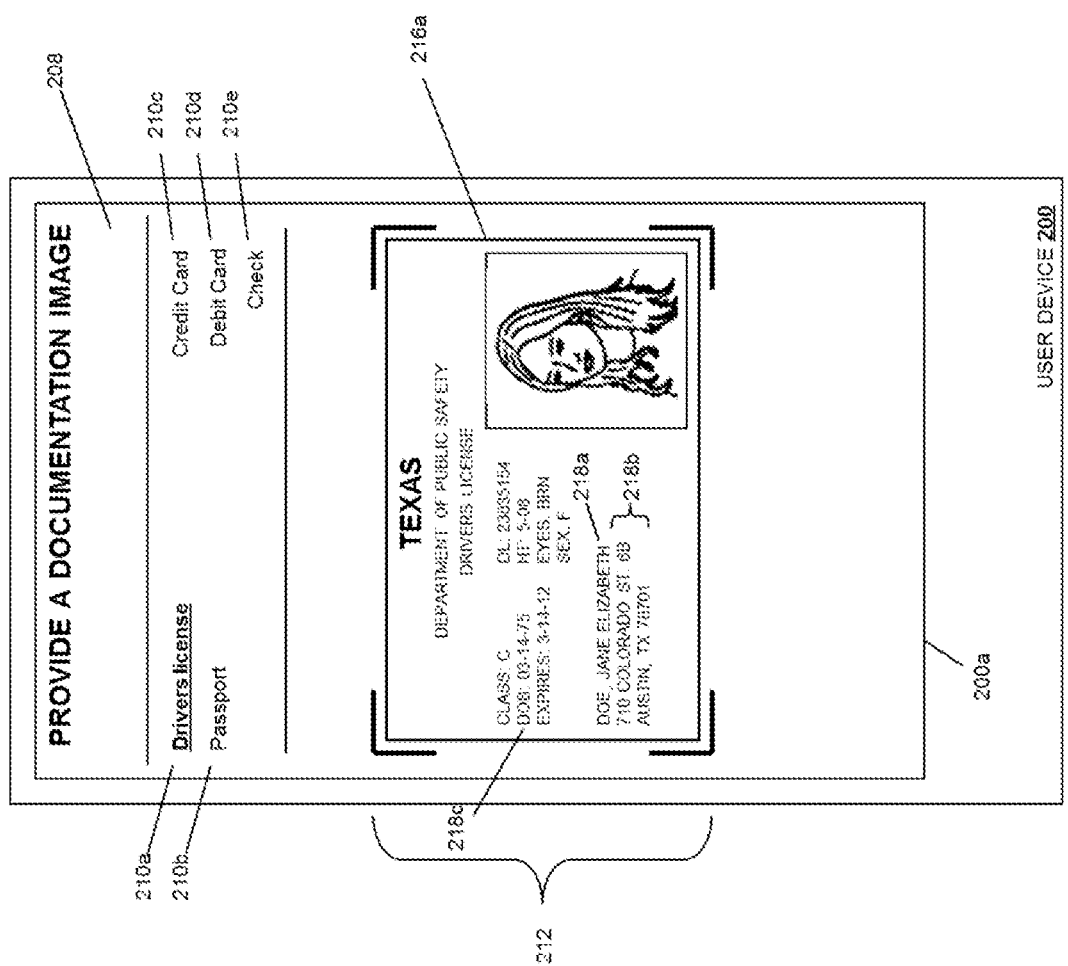

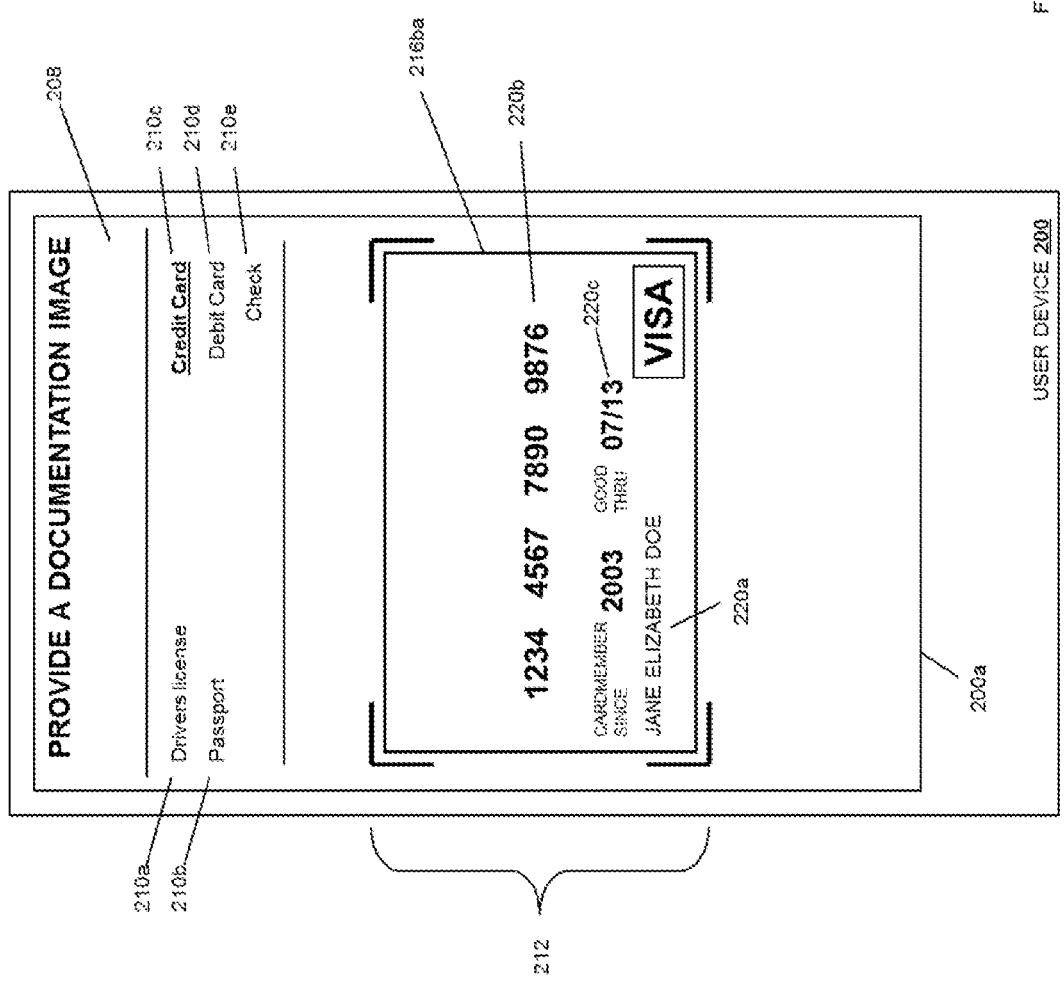

ACCOUNT INFORMATION CONFIRMATION

Name: Jane Elizabeth Doe
Birth Date: 03/14/1975

MAILING ADDRESS

Street: 710 Colorado St. 6B
City: Austin
State: Texas
Zip Code: 78701

PAYMENT INFORMATION

CC #: 1234 4567 7890 9876
CC Exp: 07/2013
CC Sec.Code: 969

FIGURE 2h

AUTOMATED USER INFORMATION PROVISION USING IMAGES

CROSS REFERENCE

This application is a Continuation of U.S. patent application Ser. No. 13/117,210 filed on May 27, 2011, entitled "Automated User Information Provision Using Images," the disclosure of which is incorporated herein by reference.

BACKGROUND

Field of the Invention

The present invention generally relates to online and/or mobile payments and more particularly to using images to automate the provision of user information to a user information form that may be used in making online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering user information such as user financial information (e.g., credit card information.) Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

As mentioned above, online and/or mobile payments typically require that a user provide a variety of user information. For example, users may be required to sign up for an account with a payment service provider by providing a name, an address, financial information, and/or a variety of other information known in the art, in order to make a payment. In another example, payments may simply require user to provide a variety of financial information. Conventionally, users are provided forms in which they must manually key in such information using an input device on a computer system. The process of manually keying in user information to forms is time-consuming and error-prone, which can lead to user dissatisfaction.

Thus, there is a need for an improved user information provision system.

BRIEF DESCRIPTION OF THE FIGURES

FIG. 2a is a front view illustrating an embodiment of a user information form displayed on a user device;

FIG. 2c is a front view illustrating an embodiment of the user device of FIG. 2a displaying an user information image request screen;

FIG. 2d is a perspective view illustrating an embodiment of a user providing a user information image to the user device of FIG. 2a;

FIG. 2e is a front view illustrating an embodiment of a user information image provided to the user device of FIG. 2a;

FIG. 2f is a front view illustrating an embodiment of a user information image provided to the user device of FIG. 2a;

FIG. 2g is a front view illustrating an embodiment of a user information image provided to the user device of FIG. 2a;

FIG. 2h is a front view illustrating an embodiment of the user information form of FIG. 2a that has been automatically provided user information from the user information images of FIGS. 2e, 2f, and 2g on the user device of FIG. 2a;

Figure 1:
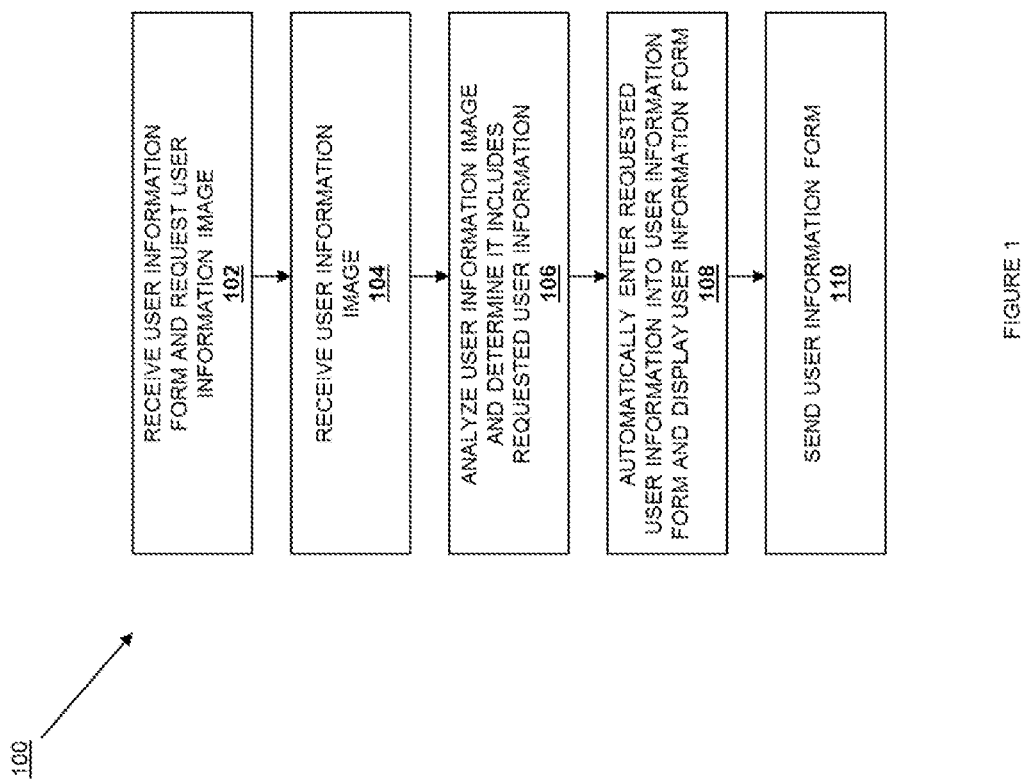
FIG. 1 is a flow chart illustrating an embodiment of a method for the automated provision of user information using images.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In one embodiment, the present disclosure provides a system and method for automatically providing user information to a user information form using an image of user documentation. A user information form is received by a user device over a network from a device of a requesting entity such as a payment service provider device or a payee device. In response to receiving the user information form, the user device requests a user information image of user documentation. A user may use a camera on the user device to take the user information image of the user documentation, and that user information image may then be analyzed by the user device using a variety of techniques including Optical Character Recognition (OCR) to determine whether it includes user information requested in request sections of the user information form. If the requested user information is included in the user information image, the user device automatically enters the requested user information into the request sections of the user information form and displays it on a display of the user device. A user may edit and/or confirm the user information in the request sections of the user information form and then send the user information form over the network to the requesting entity device.

Referring now to FIGS. 1, 2a, 2b, and 2c, a method 100 for automatically providing user information to a user information form using an image is illustrated. In the embodiment of the method 100 described below, a requesting entity is requesting user information from the user to open up a payer account, and that requesting entity may be a payment service provider such as, for example, PayPal, Inc. of San Jose, Calif., that assists in the making of payments from the user to a payee by transferring funds from a user account to a payee account of the payee. However, the requesting entity may also be a payee requesting user information from the user to make a payment. These embodiments are meant to be merely exemplary, and one of skill in the art will recognize that a variety of modifications may be made to the system discussed below without departing from the scope of the present disclosure.

The method 100 begins at block 102 where a user information form is received and a user information image is requested. In an embodiment, a user having a user device 200 including a display screen 200a, illustrated in FIG. 2a, may access a user information form 202 over a network (e.g., the Internet) by connecting to a payment service provider device of a payment service provider or a payee device of a payee. In the illustrated embodiment, the user is attempting to sign up for an account with a payment service provider, and the payment service provider is providing the user information form 202, which the user device 200 is displaying on the display 200a, for the user to enter user information into a plurality of request sections that includes a name request section 204a, a birth date request section 204b, a plurality of mailing address request sections 204c, and a plurality of payment information request sections 204d. However, the illustrated user information form 202 and request sections 204a, 204b, 204c, and 204d are meant to be merely exemplary, and one of skill in the art will recognize that a variety of different request sections requesting different user information will fall within the scope of the present disclosure. Furthermore, one of skill in the art will recognize that a user information form from a payee or other requesting entity may include the same or similar request sections, and may include different request section without departing from the scope of the present disclosure. While the user device 200 is illustrated and described below as a mobile device such as, for example, a mobile phone or computer, one of skill in the art will recognize that the automatic providing of user information to the user information form using an image may be performed on a desktop computer, on other computing systems connected to a network, and/or using a variety of other devices known in the art.

At block 102 of the method 100, the user device 200 may detect the receipt of the user information form 202 with the plurality of request sections 204a, 204b, 204c, and 204d. In one embodiment, the user information form 202 may provide metadata to the user device 200 that details the user information being requested in the request sections 204a, 204b, 204c, and 204d. In another embodiment, the user device 200 may analyze the user information form 202 to determine what user information is being requested. For example, the user device 200 may analyze the user information form 202 and determine that the request section 204a is positioned adjacent the word "name" and thus the request section 204a is requesting a user name, the request section 204b is positioned adjacent the words "birth date" and thus the request section 204a is requesting a user birth day, etc.

Figure 2B:
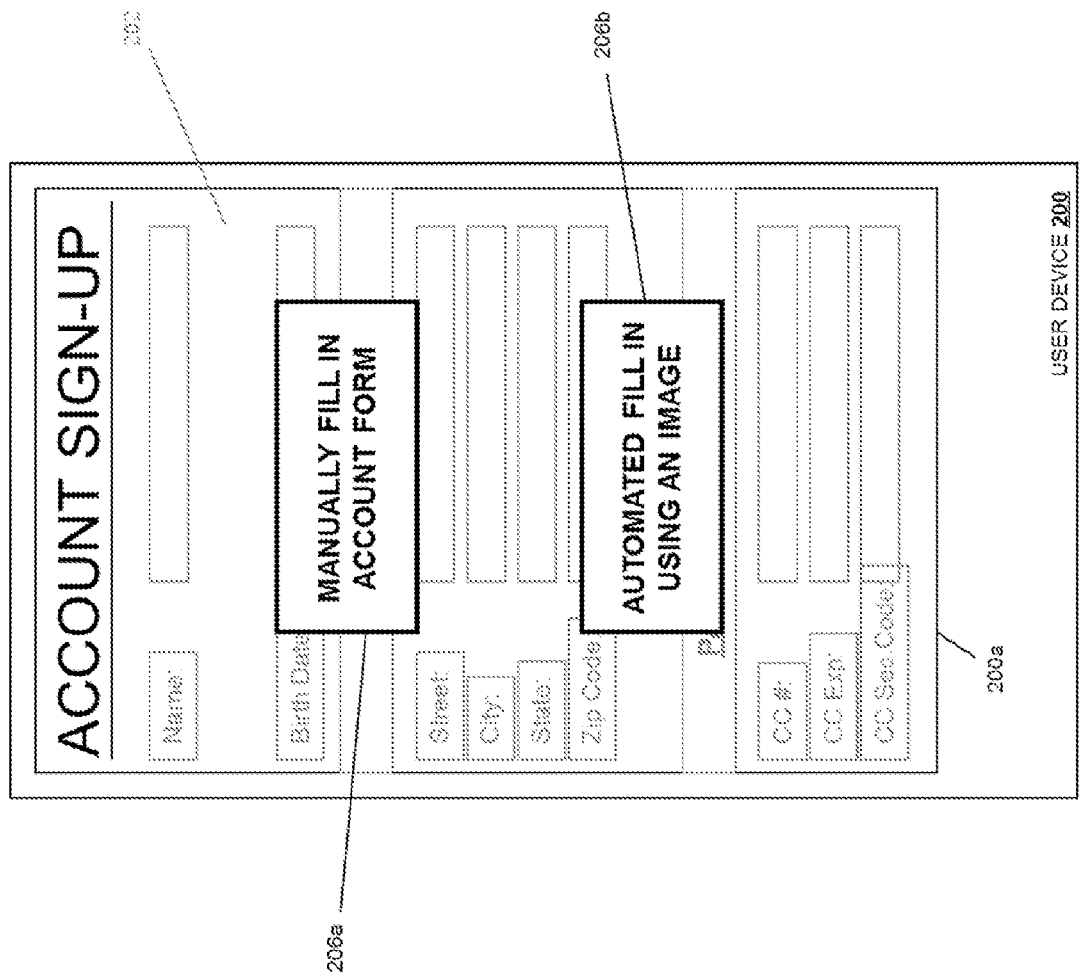
FIG. 2b is a front view illustrating an embodiment of the user device of FIG. 2a displaying selections to manually fill in the user information form or automatically fill in the user information form using images.

Upon detecting the receipt of the user information form 202, the user device 200 requests at least one user information image from the user. For example, as illustrated in FIG. 2b, upon detecting the receipt of the user information form 202, the user device 200 may display a manual fill-in option 206a and an automated fill-in using images option 206b, and the user may then select the automated fill-in using images option 206b such that the user device 200 displays a user information image request screen 208 on the display 200a, illustrated in FIG. 2c. The user information image request screen 208 includes a plurality of user documentation types including a Drivers License documentation type 210a, a Passport documentation type 210b, a Credit Card documentation type 210c, a Debit Card documentation type 210d, and a check documentation type 210e. While a plurality of user documentation types have been illustrated, those user documentation types are meant to be merely exemplary, and one of skill in the art will recognize that a variety of other user documentation types will fall within the scope of the present disclosure. The user information image request screen 208 also includes an image frame 212.

In an embodiment, the user may select one of the user documentation types (e.g., the Drivers License documentation type 210a selected in bold in FIG. 2c) to indicate the type of documentation the user is going to provide an image of. In another embodiment, the user device 200 may determine, e.g., from the analysis of the user information form 202 and the request sections 204a, 204b, 204c, and 204d, that an image of a particular user documentation type should be provided and that image may be requested by highlighting the appropriate user documentation type (e.g., the Drivers License documentation type 210a highlighted in bold in FIG. 2c.) In another embodiment, the user information request screen 208 may not display the user documentation types.

Referring now to FIGS. 1a, 2d, 2e, 2f, and 2g, the method 100 may proceed to block 104 where the user device receives a user information image. In an embodiment, as illustrated in FIG. 2d, a user 214 may take an image of user documentation 216 using a camera (not illustrated) on the user device 200 by positioning the user documentation 216 and the user device 200 such that the user documentation 216 is positioned in the image frame 212 on the user information image request screen 208, as illustrated in FIG. 2e, and activating the camera. Taking the image of the user documentation 216 results in a user information image 216a which, in the illustrated embodiment, is a user Drivers License image. The user documentation 216 and the corresponding user information image 216a include a plurality of user information such as, for example, a user name 218a, a user address 218b, a user birth date 218c, and a variety of other user information know in the art. The taking of the user information image 216a by the user 214 provides the user information image 216a to the user device 200.

In another embodiment, block 102 of the method 100 may include the user device 200 requesting an additional or different image of user documentation. For example, in the embodiment illustrated in FIGS. 2f and 2g, either the user has selected one of the user documentation types (e.g., the Credit Card documentation type 210a selected in bold in FIGS. 2f and 2g) to indicate the type of documentation the user is going to provide an image of, or the user device 200 has determined, e.g., from the analysis of the user information form 202 and the request sections 204a, 204b, 204c, and 204d, that an image of a particular user documentation type should be provided and that image has been requested by highlighting the appropriate user documentation type (e.g., the Credit Card documentation type 210a highlighted in bold in FIGS. 2f and 2g.) The user 214 may then take an image of the front (FIG. 2f) and the back (FIG. 2g) of the user documentation 216 using a camera (not illustrated) on the user device 200 by positioning the user documentation 216 and the user device 200 such that the user documentation 216 is positioned in the image frame 212 on the user information image request screen 208, and activating the camera. Taking the images of the user documentation 216 results in a first user information image 216ba (FIG. 2f) and a second user information image 216bb (FIG. 2g) which, in the illustrated embodiment, are user Credit Card images. The user documentation 216 and the corresponding user information images 216*ba* and 216*bb* include a plurality of user information such as, for example, a user name 220*a*, a user credit card number 220*b*, a user credit card expiration date 220*c*, a user credit card security code 220*d*, and a variety of other user information know in the art. The taking of the user information images 216*ba* and 216*bb* by the user 214 provides the user information images 216*ba* and 216*bb* to the user device 200.

While examples of user documentation 216 and user information images 216*a*, 216*ba*, and 216*bb* above include a driver's license and credit card, one of skill in the art will recognize that other user documentations types (e.g., the passport documentation type 210*b*, debit card documentation type 210*d*, and check documentation type 210*e*) may be substituted in the system described below without departing from the scope of the present disclosure.

Referring now to FIGS. 1, 2*e*, 2*f*, and 2*g*, the method 100 proceeds to block 106 where the user information image is analyzed and determined to include requested user information. The user device 200 may use a variety of techniques to determine whether the user information image 216 includes user information that is requested on the user information form. In an embodiment, the user device 200 may determine a type of user documentation included in the user information image 216. For example, the user device 200 may determine that the user information image 216*a* of FIG. 2*e* includes a drivers license documentation type because it was received in response to a request by the user device 200 for a drivers license documentation type (e.g., the highlighted Drivers License documentation type 210*a* in bold in FIG. 2*c*) or it was received following an selection by the user to provide a driver's license documentation type (e.g., the Drivers License documentation type 210*a* selected in bold in FIG. 2*c*.) In another example, the user device 200 may use a variety of optical image and character recognition techniques known in the art to analyze the user information image 216*a*, compare the user information image to a database of user documentations types, and recognize that the user information image 216*a* includes a driver's license documentation type.

Furthermore, the user device 200 may determine the state of issue of the driver's license using a variety of techniques. For example, the user device 200 may use a location sensor (not illustrated) included in the user device 200 to determine the location of the user device 200, and use that location as the state of issue of the driver's license. In another example, in performing optical image and character recognition techniques to analyze the user information image 216*a* and comparing the user information image to a database of user documentations types, the user device 200 may recognize that the user information image 216*a* includes a driver's license documentation type issued in Texas (e.g., from the word "TEXAS" included in the user information image 216*a*, from the layout and/or images on the user information image 216*a*, and/or from a variety of other indicators known in the art.)

The user device 200 may also use optical character recognition (OCR) techniques to analyze the user information image 216*a* and detect the user name 218*a*, user address 218*b*, and user birth date 218*c* included in the user information image 216*a*. In one embodiment, the user device 200 may be operable to use only the OCR techniques on the user information image 216*a*, without the need for the other techniques discussed above, to detect the user name 218*a*, user address 218*b*, and user birth date 218*c* included in the user information image 216*a*. However, in another embodiment, the user device 200 may increase the accuracy of detecting user information on the user information image 216 by using other information retrieved during the method 100 (e.g., user documentation type, location of issue of the user documentation type, etc.) to access a database (e.g., over a network) of user documentation types to determine what sections of the user information image 216*a* include particular user information. For example, the user device 200 may use the techniques discussed above and determine that the user information image 216*a* includes a driver's license documentation type that is issued in Texas. By accessing a database of driver's licenses, the user device 200 may determine that Texas driver's licenses include a user name 218*a* located above a user address 218*b*, both of which are positioned in a lower left corner of the driver's license, along with a user birth date 218*c* positioned mid-way down the left side of the driver's license and adjacent the characters "DOB".

Figure 2G:
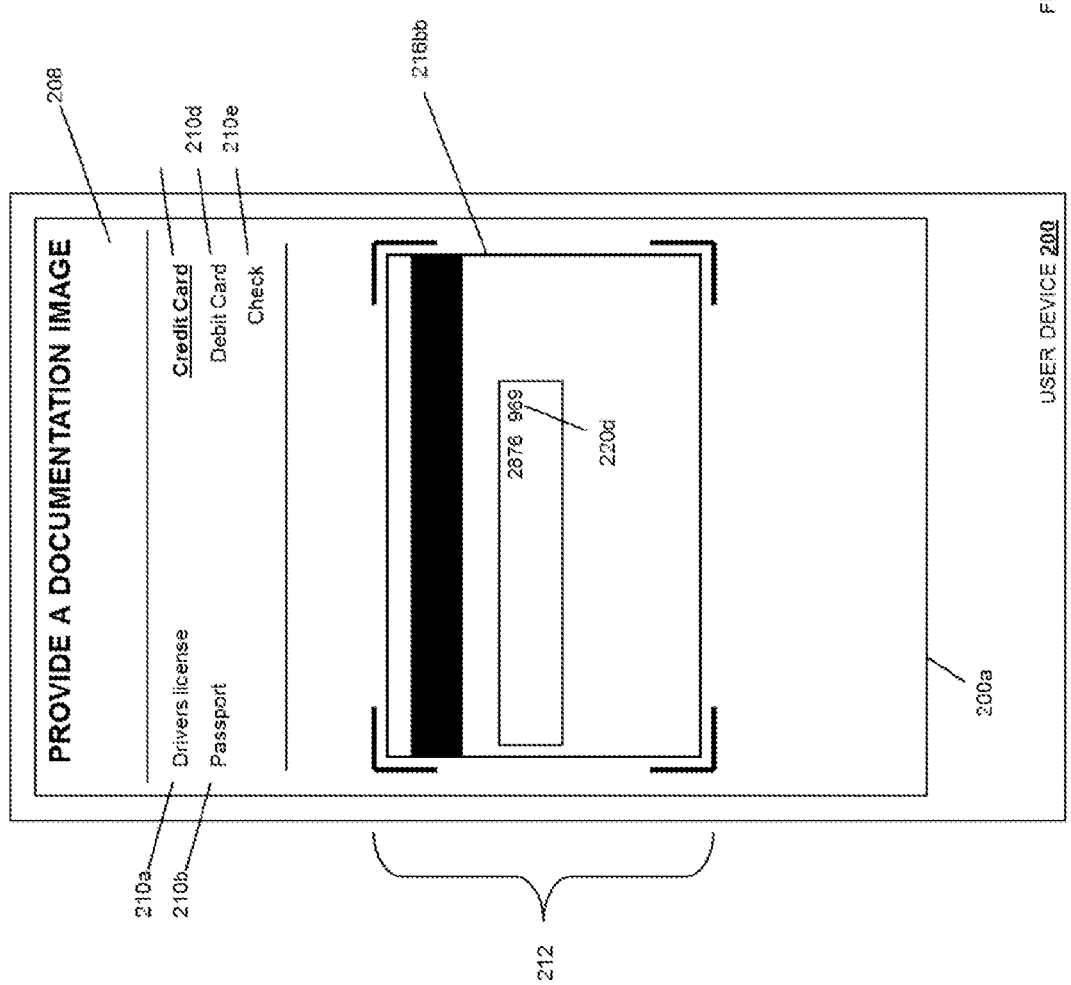

In another embodiment, the user device 200 may determine that the user information images 216*ba* and 216*bb* of FIGS. 2*f* and 2*g* include a credit card documentation type because they were received in response to a request by the user device 200 for a credit card documentation type (e.g., the highlighted Credit Card documentation type 210*c* in bold in FIG. 2*c*) or were received following an selection by the user to provide a credit card documentation type (e.g., the Credit Card documentation type 210*c* selected in bold in FIG. 2*c*.) In another example, the user device 200 may use a variety of optical image and character recognition techniques known in the art to analyze the user information images 216*ba* and 216*bb*, compare the user information image to a database of user documentations types, and recognize that the user information images 216*ba* and 216*bb* include a credit card documentation type.

Furthermore, in performing optical image and character recognition techniques to analyze the user information images 216*ba* and 216*bb* and comparing the user information images 216*ba* and 216*bb* to a database of user documentations types, the user device 200 may recognize that the user information images 216*ba* and 216*bb* includes a credit card documentation type issued by a particular credit card company (e.g., from the word "VISA" included in the user information image 216*ba*, from the layout and/or images on the user information images 216*ba* and 216*bb*, and/or from a variety of other indicators known in the art.)

The user device 200 may also use optical character recognition (OCR) techniques to analyze the user information images 216*ba* and detect the user name 220*a*, credit card number 220*b*, and credit card expiration date 220*c* included in the user information image 216*ba*, along with the credit card security code 220*d* in the user information image 216*bb*. In one embodiment, the user device 200 may be operable to use only the OCR techniques on the user information images 216*ba* and 216*bb*, without the need for the other techniques discussed above, to detect the user name 220*a*, credit card number 220*b*, credit card expiration date 220*c* and credit card security code 220*d* included in the user information images 216*ba* and 216*bb*. However, in another embodiment, the user device 200 may increase the accuracy of detecting user information on the user information images 216*ba* and 216*bb* by using other information retrieved during the method 100 (e.g., user documentation type, issuer of the user documentation type, etc.) to access a database (e.g., over a network) of user documentation types to determine what sections of the user information images 216*ba* and 216*bb* include particular user information. For example, the user device 200 may use the techniques as discussed above and determine that the user information images 216*ba* and 216*bb* includes a credit card documentation type that is issued by Visa®. By accessing a database of credit cards, the user device 200 may determine that Visa® credit cards (or all credit cards) include a user name 220*a* positioned in the lower left corner of the front side, a credit card number 220*b* positioned across the middle of the front side, a credit card expiration date positioned in the lower right corner of the front side, and a credit card security code 220*d* positioned in the far right corner of a box on the back side.

In an embodiment, the user device 200 may determine that the user information images 216*a*, 216*ba*, and 216*bb* includes requested user information by accessing a memory (not illustrated) in the user device 200 to retrieve collaborating user information. For example, the memory of the user device 200 may include a variety of collaborating user information such as, for example, a user name, user birth date, user address, user financial information, and/or a variety of other user information know in the art. The user device 200 may accesses this collaborating information and compare it to the user information detected in the user information images 216*a*, 216*ba*, and 216*bb* to help to determine if the user information detected in the user information images 216*a*, 216*ba*, and 216*bb* is the requested user information determined from the user information form 202.

Referring now to FIGS. 1, 2*e*, 2*f*, 2*g*, and 2*h*, the method 100 proceeds to block 108 where requested user information is automatically entered into the user information form and the user information form is displayed. As discussed above, the user device 200 analyzes the user information form 202 received in block 102 of the method 100 to determine what user information is being requested in the plurality of request sections 204*a*, 204*b*, 204*c*, and 204*d*. The user device 200 may then determine if the user information detected in the user information images 216*a*, 216*ba*, and 216*bb* in block 106 of the method 100 corresponds to the user information requested in the user information form 202 and, if so, automatically enter the appropriate user information detected in the user information images 216*a*, 216*ba*, and 216*bb* into the request sections 204*a*, 204*b*, 204*c*, and 204*d* of the user information form 202.

For example, the user device 200 may retrieve the user name 218*a* and/or the user name 220*a* detected in the user information images 216*a* and 216*ba* and provide a user name (e.g., "Jane Elizabeth Doe") in the name request section 204*a* of the user information form 202. The user device 200 may also retrieve the user birth date 218*c* detected in the user information image 216*a* and provide a user birth date (e.g., "03/14/1975") in the birth date request section 204*b* of the user information form 202. The user device 200 may also retrieve the user address 218*b* detected in the user information image 216*a* and provide a user address (e.g., "710 Colorado St. 6B, Austin, Tex. 78701") in the plurality of mailing address request sections 204*c* of the user information form 202. The user device 200 may also retrieve the credit card number 220*b*, the credit card expiration date 220*c*, and credit card security code 220*d* from the user information images 216*ba* and 216*bb* and provide user payment information (e.g., "1234 4567 7890 9876; 07/2013; 969") in the plurality of payment information request sections 204*d* of the user information form 202.

The user device 200 may then display an account information confirmation screen 222, illustrated in FIG. 2*h*, that includes the user information form 202 with the requested information provided in the request sections 204*a*, 204*b*, 204*c*, and 204*d*. In an embodiment, the request sections 204*a*, 204*b*, 204*c*, and 204*d* are editable such that a user may edit any of the information provided in the request sections 204*a*, 204*b*, 204*c*, and 204*d* to correct that user information, if necessary. If one or more request sections are not filled in, such as if the information image(s) does not include all the information requested in the sections, the user may enter the requested information manually, such as by using a keypad/keyboard or by a copy and paste.

The method 100 then proceeds to block 110 where the user information form 202 including the requested user information in the request sections 204*a*, 204*b*, 204*c*, and 204*d* is sent to a requesting entity. The user may use the user device 200 to send the user information form 202, illustrated in FIG. 2*h*, over the network to the payment service provider device, the payee device, and/or other requesting entity device. In an embodiment, the user device 200 may delete any user information images 216*a*, 216*ba*, and 216*bb* provided by the user after automatically providing the requested user information into the request sections 204*a*, 204*b*, 204*c*, and 204*d* of the user information form 202, and display a notification on the display 200*a* of the user device 200 that the user information images have been deleted.

Thus, a system and method for automatically providing user information on a user information form using images has been described that allows a user to quickly and easily provide their information on a form. When a user device of the user detects a user information form, the user device request an image of user documentation. Upon the receipt of such an image, the user device analyzes the image to detect user information and automatically provides that user information into the appropriate portions of the user information form. Such systems and methods allow a user to automatically provide their information on a form by simply taking an image of documentation that they already carry around with them, and saves the time and user effort necessary to manually key that user information into the user information form.

Figure 3:
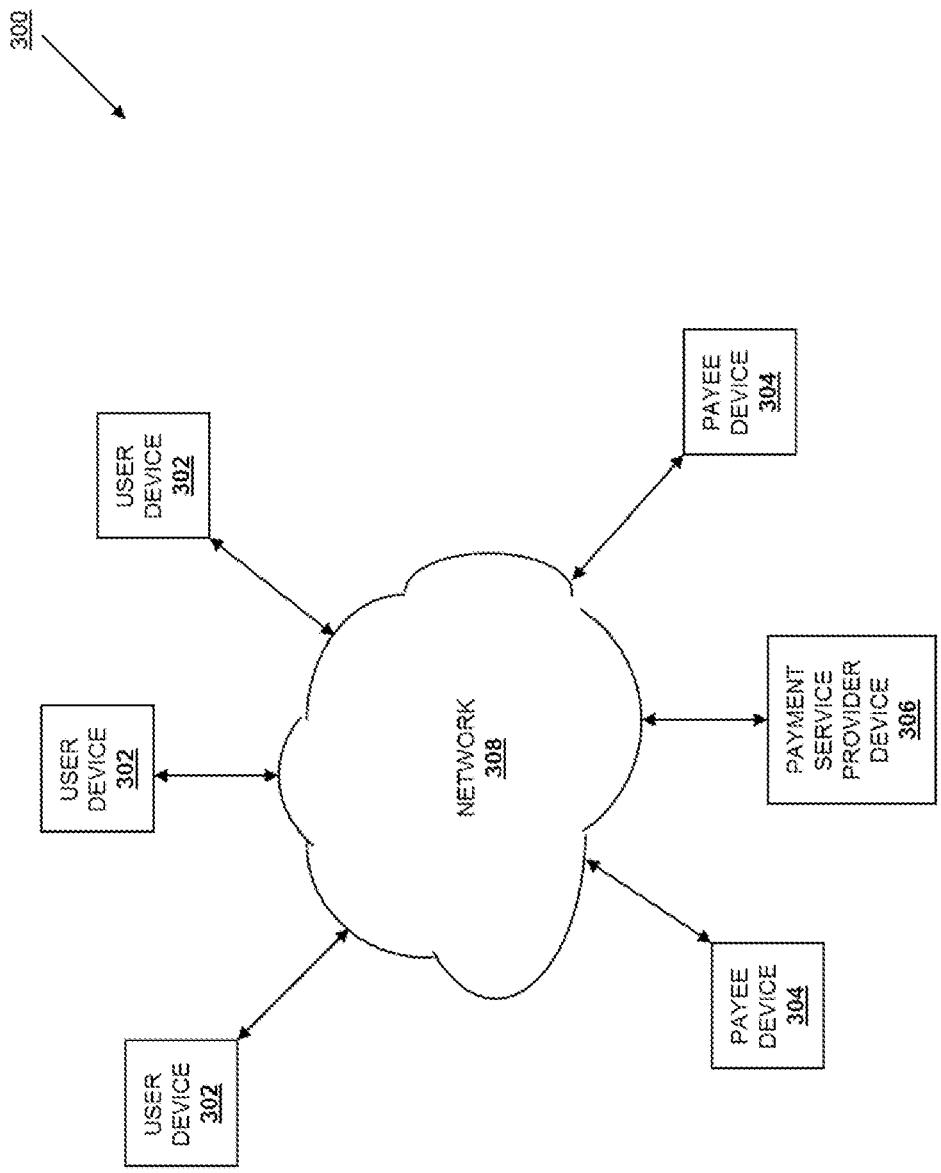
FIG. 3 is a schematic view illustrating an embodiment of a networked system.

Referring now to FIG. 3, an embodiment of a networked system 300 used in the system described above is illustrated. The networked system 300 includes a plurality of user devices 302, a plurality of payee devices 304, and a payment service provider device 306 in communication over a network 308. Any of the user devices 302 may be the user device 200, discussed above. The payee devices 304 may be the payee devices discussed above and may be operated by the payees discussed above. The payment service provider device 306 may be the payment service provider device discussed above and may be operated by a payment service provider such as, for example, PayPal Inc. of San Jose, Calif.

The user devices 302, payee devices 304, and payment service provider device 306, may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 308.

The network 308 may be implemented as a single network or a combination of multiple networks. For example, in various embodiments, the network 308 may include the Internet and/or one or more intranets, landline networks, wireless networks, and/or other appropriate types of networks.

The user devices 302 may be implemented using any appropriate combination of hardware and/or software configured for wired and/or wireless communication over network 308. For example, in one embodiment, a user device 302 may be implemented as a personal computer of a user in communication with the Internet. In other embodiments, the user device 302 may be a smart phone, personal digital assistant (PDA), laptop computer, and/or other types of computing devices.

The user device 302 may include one or more browser applications which may be used, for example, to provide a convenient interface to permit the user to browse information available over the network 308. For example, in one embodiment, the browser application may be implemented as a web browser configured to view information available over the Internet.

The user device 302 may also include one or more toolbar applications which may be used, for example, to provide user-side processing for performing desired tasks in response to operations selected by the user. In one embodiment, the toolbar application may display a user interface in connection with the browser application.

The user device 302 may further include other applications as may be desired in particular embodiments to provide desired features to the user device 302. In particular, the other applications may include a automatic form fill-out application for automatically providing user information on a form. The other applications may also include security applications for implementing user-side security features, programmatic user applications for interfacing with appropriate application programming interfaces (APIs) over the network 308, or other types of applications. Email and/or text applications may also be included, which allow the user to send and receive emails and/or text messages through the network 308. The user device 302 includes one or more user and/or device identifiers which may be implemented, for example, as operating system registry entries, cookies associated with the browser application, identifiers associated with hardware of the user device 302, or other appropriate identifiers, such as a phone number. In one embodiment, the user identifier may be used by the payment service provider device 306 to associate the user with a particular account as further described herein.

The payee devices 304 may be maintained, for example, by conventional or on-line merchants, conventional or digital goods sellers, individual sellers, and/or application developers offering various products and/or services in exchange for payment to be received conventionally or over the network 308. In this regard, the payee devices 304 may include a database identifying available products and/or services (e.g., collectively referred to as items) which may be made available for viewing and purchase by the user.

The payee devices 304 also includes a checkout application which may be configured to facilitate the purchase by the user of items. The checkout application may be configured to accept payment information from the user through the user device 302 and/or from the payment service provider through the payment service provider device 306 over the network 308.

Figure 4:
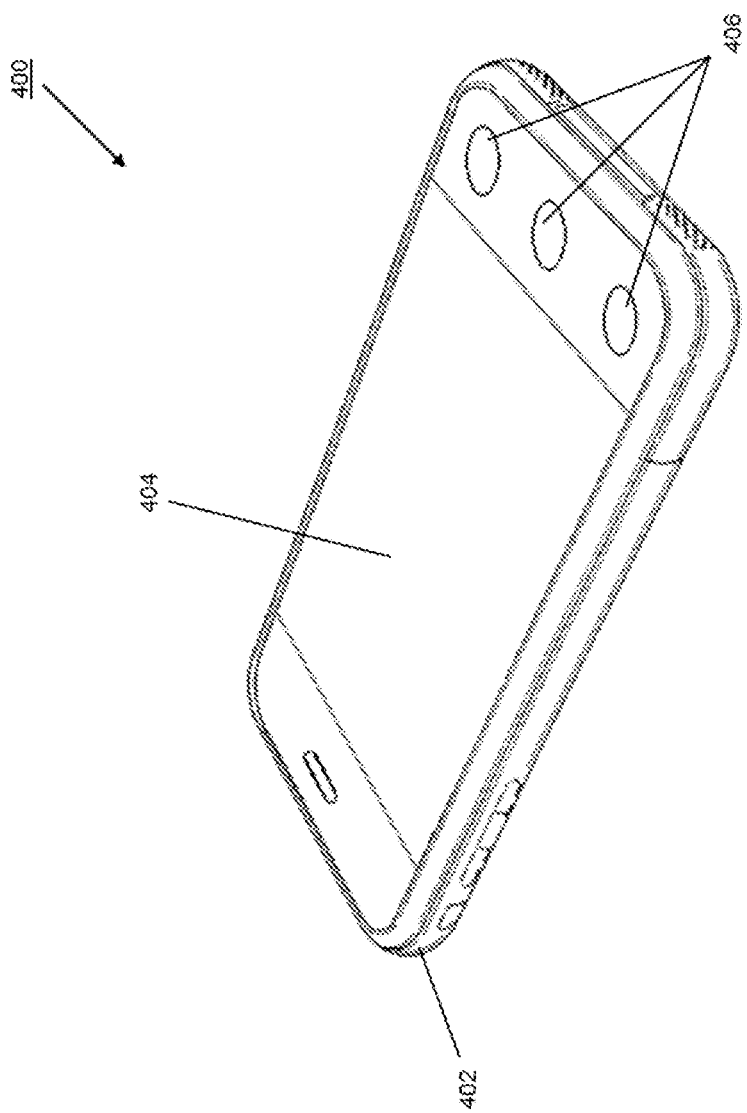
FIG. 4 is a perspective view illustrating an embodiment of a user device.

Referring now to FIG. 4, an embodiment of a user device 400 is illustrated. The user device 400 may be the user devices 200 and/or 302. The user device 400 includes a chassis 402 having a display 404 and an input device including the display 404 and a plurality of input buttons 406. One of skill in the art will recognize that the user device 400 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 5:
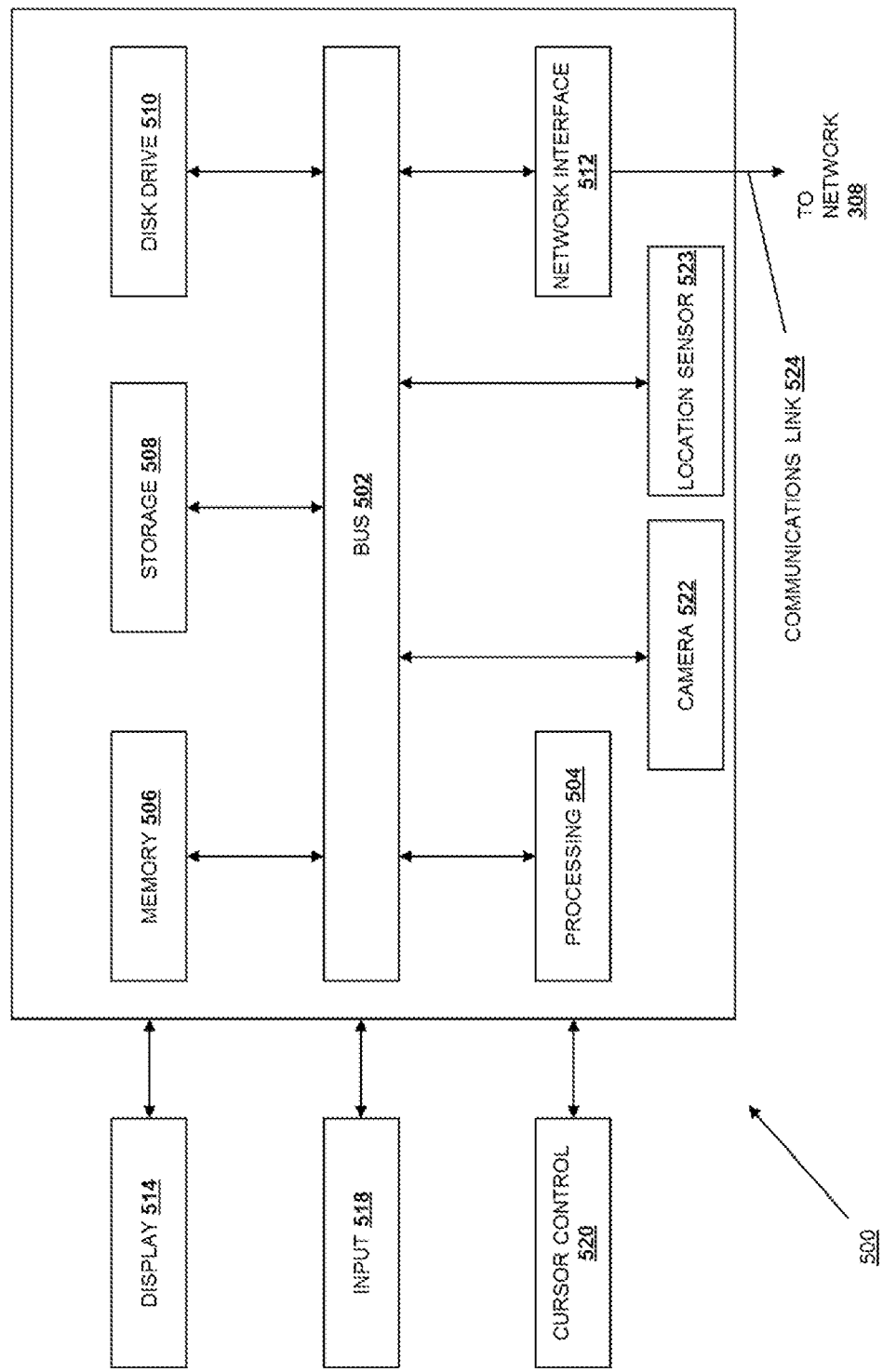
FIG. 5 is a schematic view illustrating an embodiment of a computer system.

Referring now to FIG. 5, an embodiment of a computer system 500 suitable for implementing, for example, the user device 200, the user device 302, the user device 400, the payee devices 304, and/or the payment service provider device 306, is illustrated. It should be appreciated that other devices utilized by user, payees, and payment service providers, in the system discussed above may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a camera component 522, and/or a location sensor component 523 (e.g., a Global Positioning System (GPS) device, a cell tower triangulation device, and/or a variety of other location determination devices known in the art.) In one implementation, the disk drive component 510 may comprise a database having one or more disk drive components.

In accordance with embodiments of the present disclosure, the computer system 500 performs specific operations by the processor 504 executing one or more sequences of instructions contained in the memory component 506, such as described herein with respect to the user device 200, 302, and 400, the payee device(s) 304, and/or the payment service provider device 306. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to the network 308 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Figure 6:
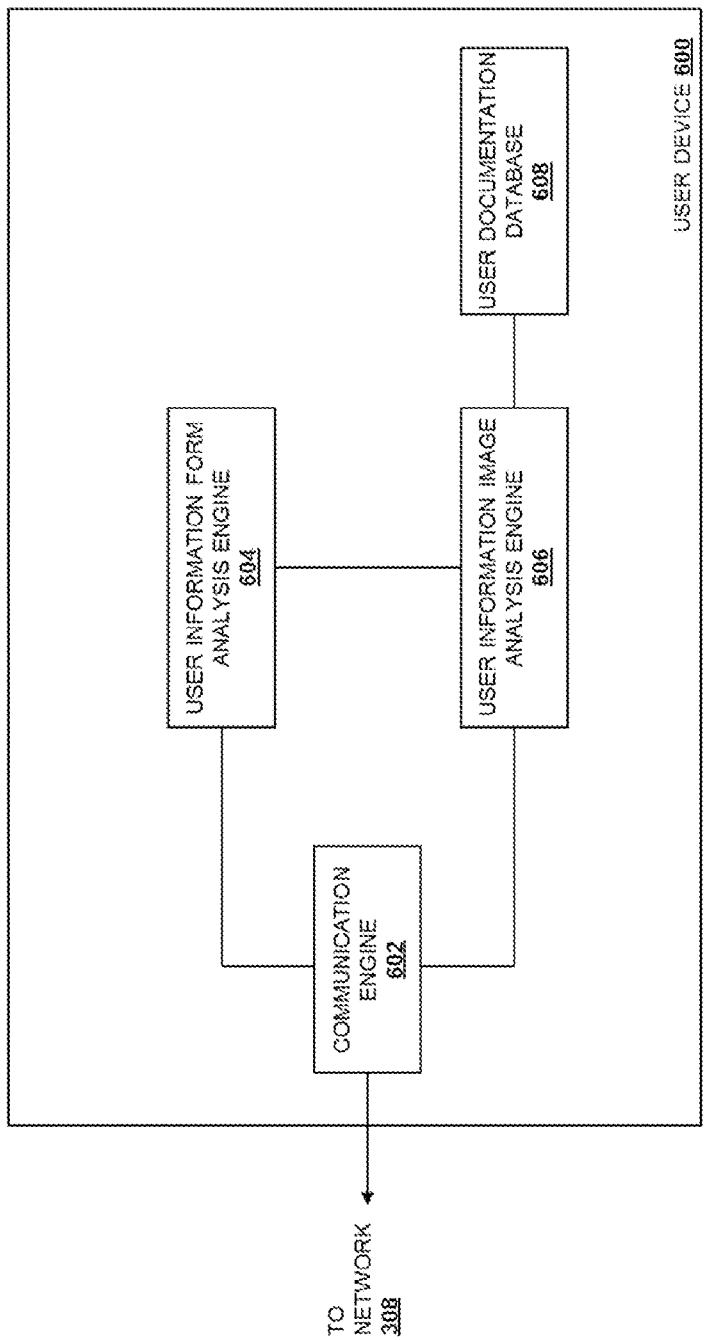
FIG. 6 is a schematic view illustrating an embodiment of a user device.

Referring now to FIG. 6, an embodiment of a user device 600 is illustrated. In an embodiment, the user device 600 may be the user device 200, 302, and/or 400. The user device 600 includes a communication engine 602 that is coupled to the network 308 and to each of a user information form analysis engine 604 and a user information image analysis engine 606. The user information image analysis engine 606 is coupled to a user documentation database 608. The communication engine 602 may be software or instructions stored on a computer-readable medium that, when executed by a processor, allows the user device 600 to send and receive information over the network 308 and to a display on the user device 600. For example, the communication engine 602 is operable to send and receive the user information form over the network 308, to request and receive information from the user through the user device 602, and/or provide a variety of other functions discussed above. The user information form analysis engine 604 may be software or instructions stored on a computer-readable medium that, when executed by the processor, allow the user device 600 to analyze user information forms to determine what user information is being requested, as discussed above. The user information image analysis engine 606 may be software or instructions stored on a computer-readable medium that, when executed by the processor, allow the user device 600 to analyze user information images to detect user information included in the user information images, as discussed above, and may access the user documentation database 608 for information that helps in that analysis, as discussed above. While the user documentation database 608 has been illustrated as located in the user device 600, one of skill in the art will recognize that it may be connected to the user information image analysis engine 606 through the network 308 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users, payment service providers, and payees; however, a user can provide user information, or otherwise interact with any type of recipient, including charities and individuals. Thus, payees as used herein can also include charities, individuals, and any other entity or person receiving user information from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An automated user information provision system, comprising:
   a non-transitory memory; and
   one or more hardware processors coupled to the non-transitory memory and configured to read instructions from the non-transitory memory to perform operations comprising:
   determining that a user device has accessed a digital user information form that includes a first user information request section;
   providing, for display on the user device, a request for an image that identifies a type of document to be included in the image;
   receiving, from an image capturing device on the user device, a user information image that includes a document that is the type of document identified in the request;
   analyzing the user information image to determine that the document included in the user information image includes first user information that is requested in the first user information request section;
   automatically filling the first user information request section of the digital user information form with the first user information that was determined to be included in the user information image and that is requested in the first user information request section; and
   providing, for display on a screen of the user device, the digital user information form including the first user information request section filled with the first user information.

2. The automated user information provision system of claim 1, wherein the non-transitory memory and the one or more hardware processors are included in the user device that is provided by a mobile phone.

3. The automated user information provision system of claim 1, wherein the operations further comprise:
analyzing the digital user information form to determine that the first user information request section requests a type of information that is provided in the type of document, wherein the request for the image that identifies the type of document to be included in the image is provided in response to determining that the first user information request section request the type of information that is provided in the type of document.

4. The automated user information provision system of claim 1, wherein the operations further comprise:
receiving a user edit to the first user information that was used to automatically fill the first user information request section of the digital user information form.

5. The automated user information provision system of claim 1, wherein the operations further comprise:
sending, to a digital user information form provider, the digital user information form that includes the first user information request section filled with the first user information.

6. The automated user information provision system of claim 1, wherein the operations further comprise:
deleting the user information image subsequent to automatically filling the first user information request section of the digital user information form with the first user information.

7. The automated user information provision system of claim 1, wherein the digital user information form includes at least one second user information request section, and wherein the operations further comprise:
analyzing the user information image to determine that the document included in the user information image includes second user information that is requested in the at least one second user information request section;
automatically filling the at least one second user information request section of the digital user information form with the second user information that was determined to be included in the user information image and that is requested in the at least one second user information request section; and
providing, for display on the screen of the user device, the digital user information form including the at least one second user information request section filled with the second user information.

8. A method for automated user information provision, comprising:
determining, using at least one processor, that a user device has accessed a digital user information form that includes a first user information request section;
providing, for display on a display device using the at least one processor, a request for an image that identifies a type of document to be included in the image;
receiving, from an image capturing device on the user device using the at least one processor, a user information image that includes a document that is the type of document identified in the request;
analyzing, using the at least one processor, the user information image to determine that the document included in the user information image includes first user information that is requested in the first user information request section;
automatically filling, using the at least one processor, the first user information request section of the digital user information form with the first user information that was determined to be included in the user information image and that is requested in the first user information request section; and
providing, for display on the display device of the user device using the at least one processor, the digital user information form including the first user information request section filled with the first user information.

9. The method of claim 8, wherein the at least one processor is included in the user device that is provided by a mobile phone.

10. The method of claim 8, further comprising:
analyzing, using the at least one processor, the digital user information form to determine that the first user information request section requests a type of information that is provided in the type of document, wherein the request for the image that identifies the type of document to be included in the image is provided in response to determining that the first user information request section request the type of information that is provided in the type of document.

11. The method of claim 8, further comprising:
receiving, using the at least one processor, a user edit to the first user information that was used to automatically fill the first user information request section of the digital user information form.

12. The method of claim 8, further comprising:
sending, to a digital user information form provider using the at least one processor, the digital user information form that includes the first user information request section filled with the first user information.

13. The method of claim 8, further comprising:
deleting, using the at least one processor, the user information image subsequent to automatically filling the first user information request section of the digital user information form with the first user information.

14. The method of claim 8, wherein the digital user information form includes at least one second user information request section, and wherein the method further comprises:
analyzing, using the at least one processor, the user information image to determine that the document included in the user information image includes second user information that is requested in the at least one second user information request section;
automatically filling, using the at least one processor, the at least one second user information request section of the digital user information form with the second user information that was determined to be included in the user information image and that is requested in the at least one second user information request section; and
providing, for display on the display device using the at least one processor, the digital user information form including the at least one second user information request section filled with the second user information.

15. A non-transitory machine-readable medium having stored thereon machine-readable instructions executable to cause at least one processor to perform operations comprising:
determining that a user device has accessed a digital user information form that includes a first user information request section;
providing, for display on the user device, a request for an image that identifies a type of document to be included in the image;

receiving, from an image capturing device on the user device, a user information image that includes a document that is the type of document identified in the request;

analyzing the user information image to determine that the document included in the user information image includes first user information that is requested in the first user information request section;

automatically filling the first user information request section of the digital user information form with the first user information that was determined to be included in the user information image and that is requested in the first user information request section; and providing, for display on a screen of the user device, the digital user information form including the first user information request section filled with the first user information.

16. The non-transitory machine-readable medium of claim 15, wherein the operations further comprise:

analyzing the digital user information form to determine that the first user information request section requests a type of information that is provided in the type of document, wherein the request for the image that identifies the type of document to be included in the image is provided in response to determining that the first user information request section request the type of information that is provided in the type of document.

17. The non-transitory machine-readable medium of claim 15, wherein the operations further comprise:

receiving a user edit to the first user information that was used to automatically fill the first user information request section of the digital user information form.

18. The non-transitory machine-readable medium of claim 15, the operations further comprise:

sending, to a digital user information form provider, the digital user information form that includes the first user information request section filled with the first user information.

19. The non-transitory machine-readable medium of claim 15, wherein the operations further comprise:

deleting the user information image subsequent to automatically filling the first user information request section of the digital user information form with the first user information.

20. The non-transitory machine-readable medium of claim 15, wherein the digital user information form includes at least one second user information request section, and wherein the operations further comprise:

analyzing the user information image to determine that the document included in the user information image includes second user information that is requested in the at least one second user information request section;

automatically filling the at least one second user information request section of the digital user information form with the second user information that was determined to be included in the user information image and that is requested in the at least one second user information request section; and providing, for display on the screen of the user device, the digital user information form including the at least one second user information request section filled with the second user information.

* * * * *